US012511720B2

(12) United States Patent
Einy et al.

(10) Patent No.: US 12,511,720 B2
(45) Date of Patent: Dec. 30, 2025

(54) IMAGE DENOISING FOR EXAMINATION OF A SEMICONDUCTOR SPECIMEN

(71) Applicant: Applied Materials Israel Ltd., Rehovot (IL)

(72) Inventors: Tamir Einy, Rehovot (IL); Dror Alumot, Tel Aviv (IL); Yarden Zohar, Holon (IL); Anna Levant, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 448 days.

(21) Appl. No.: 17/983,181

(22) Filed: Nov. 8, 2022

(65) Prior Publication Data

US 2024/0153043 A1  May 9, 2024

(51) Int. Cl.
*G06T 5/70* (2024.01)
*G06T 5/50* (2006.01)
*G06T 7/30* (2017.01)

(52) U.S. Cl.
CPC .................. *G06T 5/70* (2024.01); *G06T 5/50* (2013.01); *G06T 7/30* (2017.01);
(Continued)

(58) Field of Classification Search
CPC .... G06T 5/70; G06T 5/50; G06T 7/30; G06T 2207/10016; G06T 2207/20081; G06T 2207/20212; G06T 2207/30148; G06T 2207/20084; G06T 5/60; G06T 7/001; G06T 7/10; G06T 7/0004; G06T 7/194; G06T 7/73; G06T 3/4046; G06T 9/002; G06T 2207/20076; G06N 20/00; G06N 3/02; G06N 3/08–088; G06N 3/0445; G06N 3/0454; G06N 3/0464; G06N 3/4046; G06N 3/4053; G06N 7/00; G06N 7/01; G06V 10/72; G06V 10/774; G06V 10/141; G06V 10/143; G06V 10/54; G06V 10/7715; G06V 2201/06; G06V 10/454; G06V 10/82; G06V 20/41; G06V 30/18057;
(Continued)

(56) References Cited

U.S. PATENT DOCUMENTS

2019/0005629 A1 * 1/2019 Sharma ................ G06T 3/4046
2022/0383456 A1 * 12/2022 Gulati ..................... G06T 7/001
(Continued)

FOREIGN PATENT DOCUMENTS

CN  109690749 A * 4/2019 ............. G01N 21/88

*Primary Examiner* — Jose L Couso
(74) *Attorney, Agent, or Firm* — Lowenstein Sandler LLP

(57) ABSTRACT

There is provided an image generation system and method. The method comprises obtaining a runtime image of a semiconductor specimen with a low Signal-to-noise ratio (SNR), and processing the runtime image using a machine learning (ML) model to obtain an output image with a high SNR. The ML model is previously trained using a training set comprising a plurality of low SNR images associated with a high SNR image. The plurality of low SNR images correspond to a plurality of sequences of frames acquired in a plurality of runs of scanning a first site of the specimen. The high SNR image is generated based on the plurality of low SNR images. The training comprises, for each low SNR image: processing the low SNR image by the ML model to obtain predicted image data, and optimizing the ML model based on the predicted image data and the high SNR image.

20 Claims, 5 Drawing Sheets

(52) U.S. Cl.
CPC .............. *G06T 2207/10016* (2013.01); *G06T 2207/20081* (2013.01); *G06T 2207/20212* (2013.01); *G06T 2207/30148* (2013.01)

(58) Field of Classification Search
CPC ........... G06V 20/698; G06V 30/19173; G06K 7/1482; G06F 18/214; G06F 18/22; G06F 18/241; G06F 18/24; G06F 18/2411; G06F 18/2415; G06F 30/27; Y10S 128/925; H01L 22/12; H01L 22/20; H01L 22/24; H01L 22/30; G03F 7/70425; G03F 7/705; G03F 7/70625; G03F 7/70675
See application file for complete search history.

(56) References Cited

U.S. PATENT DOCUMENTS

| | | | |
|---|---|---|---|
| 2023/0128610 A1* | 4/2023 | Yerushalmi | G06F 17/18 706/12 |
| 2023/0136110 A1* | 5/2023 | Theagarajan | G06N 5/022 706/45 |
| 2023/0196732 A1* | 6/2023 | Kucher | G06N 20/10 382/149 |

* cited by examiner

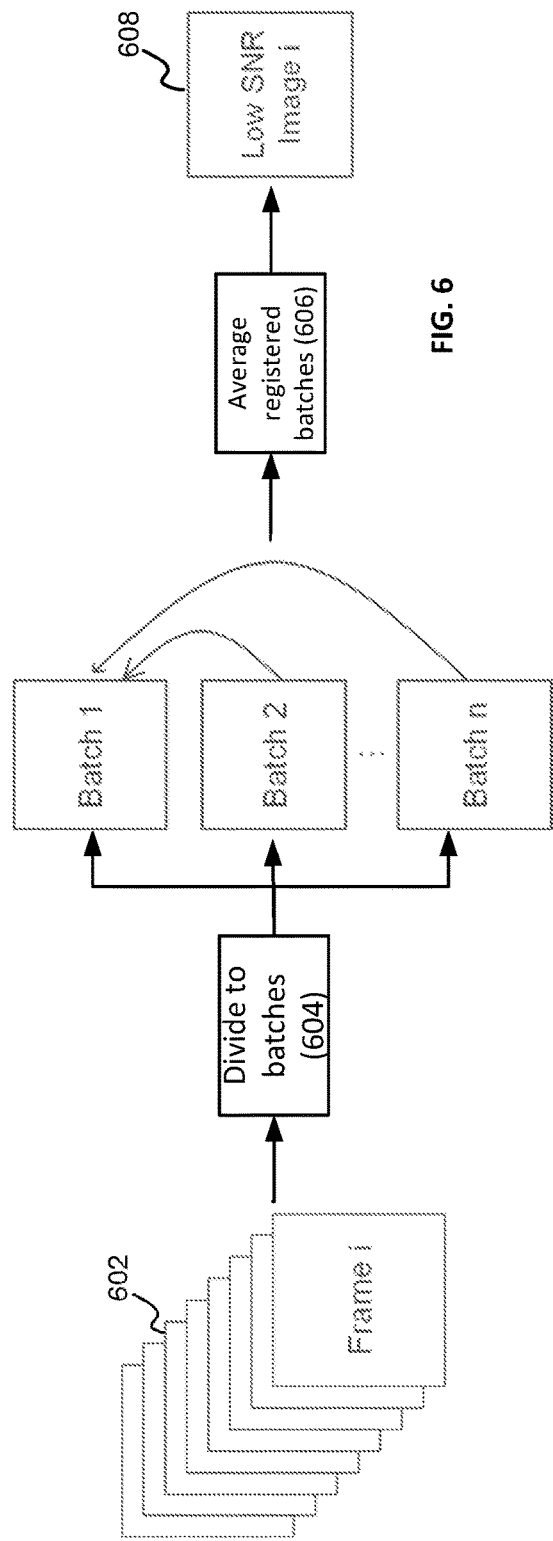
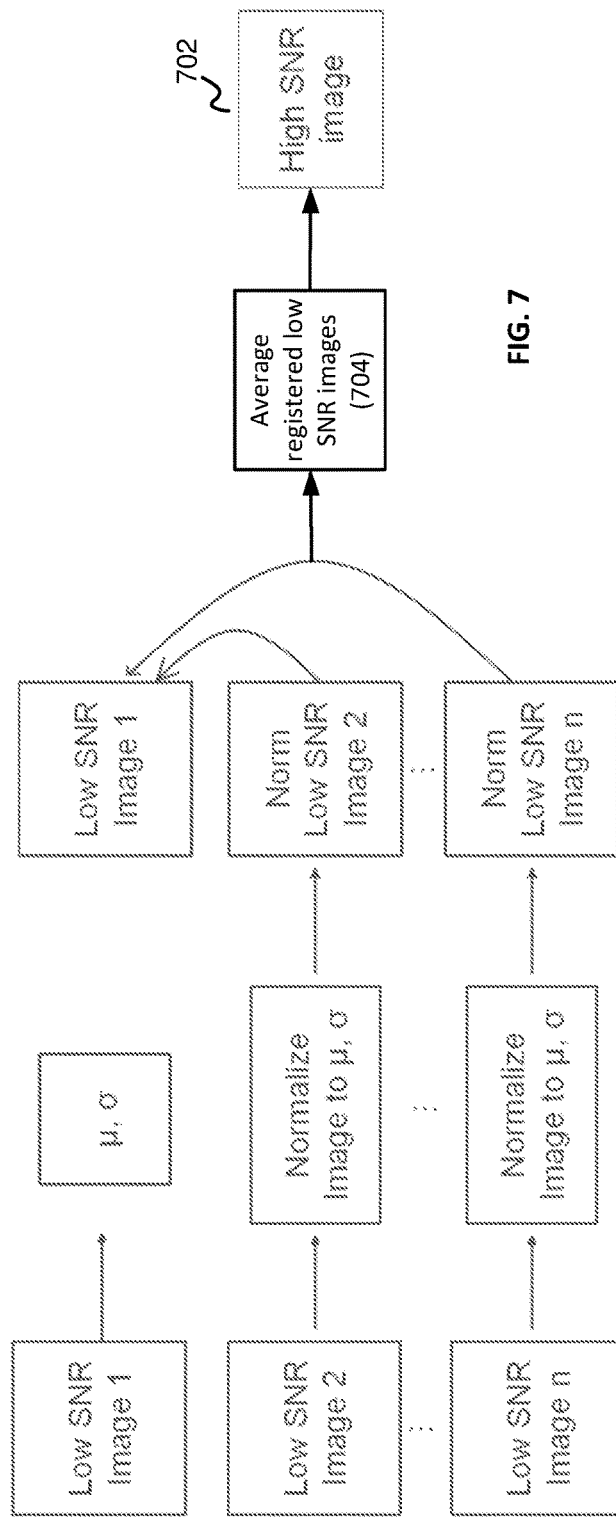
FIG. 6
FIG. 7

IMAGE DENOISING FOR EXAMINATION OF A SEMICONDUCTOR SPECIMEN

TECHNICAL FIELD

The presently disclosed subject matter relates, in general, to the field of examination of a semiconductor specimen, and more specifically, to image denoising for semiconductor specimen images.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc. Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the examination process so as to provide accurate and efficient solutions for automating specific examination applications and promote higher yield.

SUMMARY

In accordance with certain aspects of the presently disclosed subject matter, there is provided an image generation system, the system comprising a processing and memory circuitry (PMC) configured to: obtain a runtime image of a semiconductor specimen with a low Signal-to-noise ratio (SNR); and process the runtime image using a machine learning (ML) model to obtain an output image with a high SNR relatively higher with respect to the low SNR, wherein the ML model is previously trained during setup using a training set comprising a plurality of low SNR images respectively associated with a same high SNR image, the plurality of low SNR images corresponding to a plurality of sequences of frames acquired by an examination tool in a plurality of runs of scanning a first site of the semiconductor specimen, the high SNR image generated based on the plurality of low SNR images; wherein the training of the ML model comprises, for each low SNR image: processing the low SNR image by the ML model to obtain predicted image data, and optimizing the ML model based on the predicted image data and the high SNR image.

In addition to the above features, the system according to this aspect of the presently disclosed subject matter can comprise one or more of features (i) to (x) listed below, in any desired combination or permutation which is technically possible:

(i). Each low SNR image in the plurality of low SNR images is generated by: acquiring a sequence of frames by the examination tool in one run of scanning the first site; dividing the sequence of frames into a plurality of batches in accordance with a batch size; registering the plurality of batches; and combining the registered plurality of batches to obtain the low SNR image.

(ii). The batch size is specifically selected such that correlation between the registered plurality of batches meets a predetermined threshold.

(iii). The low SNR image is generated using all frames in the sequence of frames, such that the ML model, upon being trained, is capable of generating, for a given runtime image, an output image with improved precision, taking into consideration one or more image artifacts in the given runtime image that are caused by one or more physical effects on the specimen.

(iv). The high SNR image is generated by: normalizing the plurality of low SNR images to have similar image statistics; registering the normalized plurality of low SNR images, giving rise to registered plurality of low SNR images; and combining the registered plurality of low SNR images to obtain the high SNR image.

(v). The PMC is configured to: upon obtaining the runtime image, normalize the runtime image to have similar image statistics as of the plurality of low SNR images, and process the normalized runtime image using the ML model; and upon obtaining the output image, normalize the output image to have similar image statistics as of the runtime image, wherein image statistics of the plurality of low SNR images are calculated and stored during the training.

(vi). The predicted image data is predicted noise between a predicted high SNR image and the low SNR image. The ML model is optimized using a loss function representative of a residual between the predicted noise and an actual noise between the low SNR image and the high SNR image.

(vii). The predicted image data is a predicted high SNR image, and wherein the ML model is optimized using a loss function representative of a difference between the predicted high SNR image and the high SNR image.

(viii). The plurality of low SNR images are acquired from a first detection perspective of the examination tool, and the training set further comprises a second plurality of low SNR images acquired from a second detection perspective of the examination tool, and a second high SNR image generated based on the second plurality of low SNR images. The trained ML model is capable of processing runtime images acquired from the first detection perspective and the second detection perspective.

(ix). The training set further comprises a second plurality of low SNR images corresponding to a second plurality of sequences of frames acquired by the examination tool in a second plurality of runs of scanning a second site of the semiconductor specimen, and a second high SNR image generated based on the second plurality of low SNR images. The first and second plurality of low SNR images are normalized to have similar image statistics, and the first high SNR image and the second high SNR image are normalized to have similar image statistics, prior to the training.

(x). The output image with a high SNR as generated by the ML model is usable for obtaining measurements with improved precision.

In accordance with other aspects of the presently disclosed subject matter, there is provided a method of training a machine learning (ML) model for image generation, the method comprising: generating a training set comprising a plurality of low Signal-to-noise ratio (SNR) images respectively associated with a same high SNR image, the plurality of low SNR images corresponding to a plurality of sequences of frames acquired by an examination tool in a plurality of runs of scanning a first site of a semiconductor specimen, the high SNR image generated based on the plurality of low SNR images; and for each low SNR image of the plurality of low SNR images, processing the low SNR image by the ML model to obtain predicted image data, and optimizing the ML model based on the predicted image data and the high SNR image; wherein the ML model, upon being trained, is usable for processing a runtime image of a semiconductor specimen with a low SNR to obtain an output image with a high SNR relatively higher with respect to the low SNR.

This aspect of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform an image generation method, the method comprising: obtaining a runtime image of a semiconductor specimen with a low Signal-to-noise ratio (SNR); and processing the runtime image using a machine learning (ML) model to obtain an output image with a high SNR relatively higher with respect to the low SNR, wherein the ML model is previously trained during setup using a training set comprising a plurality of low SNR images respectively associated with a same high SNR image, the plurality of low SNR images corresponding to a plurality of sequences of frames acquired by an examination tool in a plurality of runs of scanning a first site of the semiconductor specimen, the high SNR image generated based on the plurality of low SNR images; wherein the training of the ML model comprises, for each low SNR image: processing the low SNR image by the ML model to obtain predicted image data, and optimizing the ML model based on the predicted image data and the high SNR image.

This aspect of the disclosed subject matter can comprise one or more of features (i) to (x) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 6 shows a schematic illustration of generating a low SNR image in accordance with certain embodiments of the presently disclosed subject matter.

FIG. 7 shows a schematic illustration of generating a high SNR image in accordance with certain embodiments of the presently disclosed subject matter.

DETAILED DESCRIPTION OF EMBODIMENTS

Figure 1:
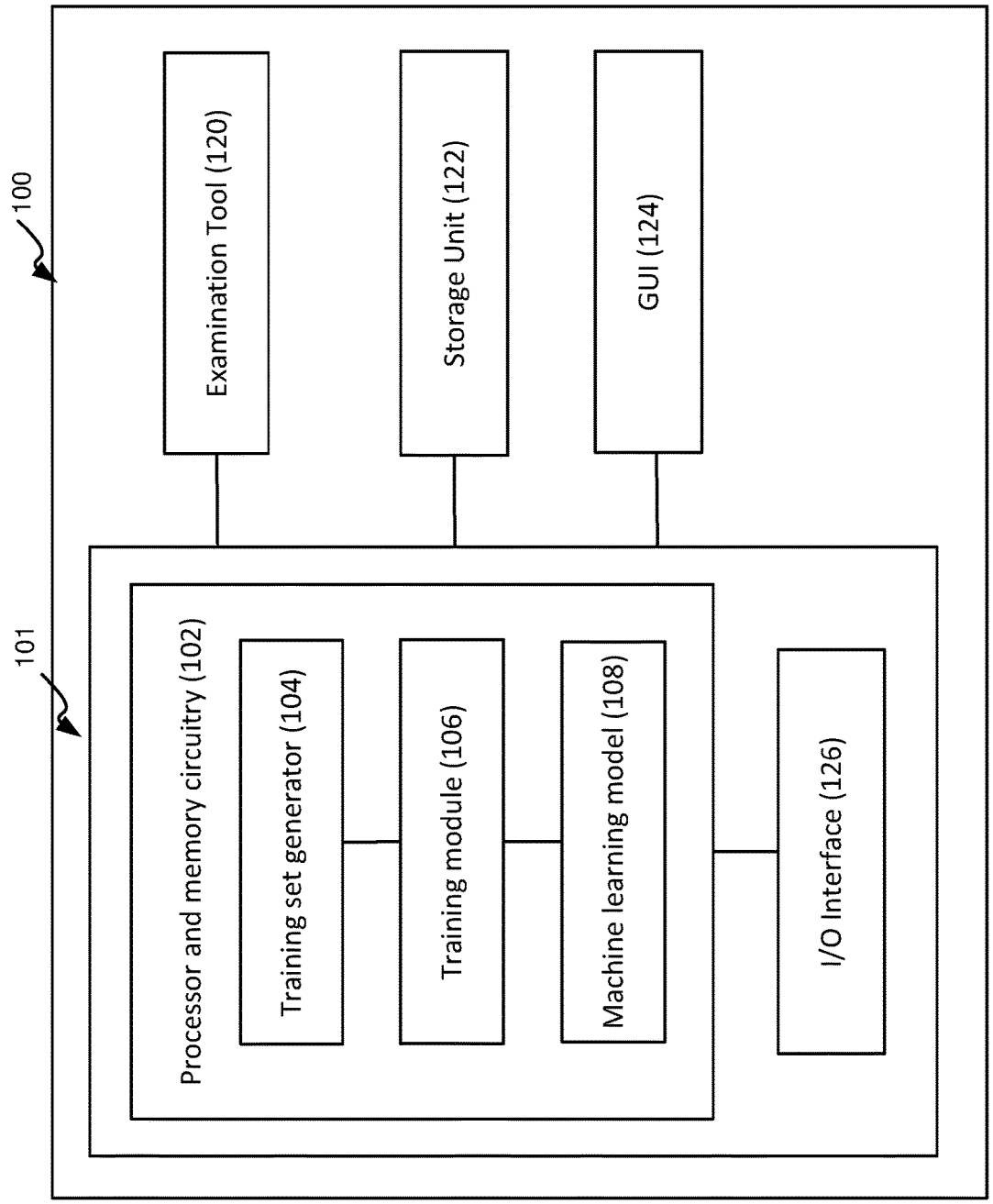
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "processing", "training", "optimizing", "examining", "generating", "learning", "acquiring", "dividing", "registering", "combining", "normalizing", "calculating", "scanning", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the training system for training a machine learning (ML) model, the image generation system using the trained ML model, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The process of semiconductor manufacturing often requires multiple sequential processing steps and/or layers, each one of which could possibly cause errors that may lead to yield loss. Various examination operations, such as defect-related examination, and/or metrology-related examination, can be performed at various processing steps/layers during the manufacturing process to monitor and control the process.

As described above, various types of examination tools can be used for performing examination of a semiconductor specimen. By way of example, scanning electron microscopes (SEM) is a type of electron microscope that produces images of a specimen by scanning the specimen with a focused beam of electrons. The electrons interact with atoms in the specimen, producing various signals that contain information on the surface topography and/or composition of the specimen. SEM is capable of accurately inspecting and measuring features during the manufacture of semiconductor wafers.

A SEM image can be generated by aggregating a sequence of frames captured for an area of the semiconductor specimen, which are consecutively acquired by a SEM. In order to obtain a SEM image with higher quality (e.g., higher signal-to-noise ratio (SNR)), the electron beam dose used to scan the wafer (which can be reflected as, e.g., the number of frames captured for the area, and/or the current of the electron beam at a working point used for capturing the frames etc.) has to reach a certain amount so as to reduce noises in the resultant image. However, capturing a large number of frames corresponds to long image acquisition time by the electron beam tool, thus affecting the throughput of the examination process.

In addition, as a consequence of the electron beam impinging on the specimen during the image acquisition, the specimen can be physically damaged. This phenomenon is referred to as "shrinkage" or "slimming". For instance, a typical amplitude of shrinkage can be, e.g., between 5% to 10% of the dimensions of the structural features on the wafer, depending on the different layers and/or materials of a specimen, which is not desired for the customer. In addition, during the image acquisition, the surface of the specimen is scanned with a focused beam of electrons and the specimen continuously collects charges. The buildup of the surface charge on a specimen caused by the electron beam may cause image artifacts, such as, e.g., image distortion, variations related to gray level, contrast, edge sharpness, etc.

In some cases, in order to reduce the physical effects on a production wafer, the electron dose of the electron beam tool used for acquiring the frames is restricted. However, the SEM images obtained with such restriction are typically very noisy with a low SNR. It is undesired, and in some cases even impossible, to perform metrology operations such as CD measurements on low SNR images, as the measurements obtained from such images would have reduced precision and accuracy. In some cases, annotation needs to be made on the low SNR images, either manually by a user, or automatically by an annotation system. Annotation on low SNR images can be very challenging, and the resultant annotation on such images is likely to be inaccurate and error prone. In some cases, such annotated data are used as ground truth for the purpose of training a ML model, which may unavoidably mislead the ML model, thus degrading the prediction performance.

Accordingly, certain embodiments of the presently disclosed subject matter propose to train a ML model for the purpose of image denoising. The trained ML model can process input low SNR images and output corresponding high SNR images. By using the trained ML model, the examination tool can maintain a low electron dose used for capturing the frames, thus reducing image acquisition time of the tool as well as physical effects on the specimen. In addition, the high SNR images generated using the ML model ensures measurements derived therefrom have improved precision, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect review, defect classification, segmentation, and/or metrology operations, such as, e.g., critical dimension (CD) measurements, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning (in a single or in multiple scans), imaging, sampling, reviewing, measuring, classifying and/or other processes provided with regard to the specimen or parts thereof. Without limiting the scope of the disclosure in any way, it should also be noted that the examination tools 120 can be implemented as machines of various types, such as optical machines, electron beam machines (e.g., Scanning Electron Microscope (SEM), Atomic Force Microscopy (AFM), or Transmission Electron Microscope (TEM), etc.), and so on.

The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). In some cases, at least one of the examination tools 120 has metrology capabilities and can be configured to capture images and perform metrology operations on the captured images. Such an examination tool is also referred to as a metrology tool.

The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools.

It is to be noted that the term "images" in "runtime image(s)", "training image(s)", "low SNR image(s)", and "high SNR image(s)", etc., used herein can refer to original images/frames of the specimen captured by the examination tool during the manufacturing process, derivatives of the captured images/frames obtained by various pre-processing stages, and/or computer-generated synthetic images (in some cases based on design data). It is to be noted that in some cases the images referred to herein can include image data (e.g., captured images, processed images, etc.) and associated numeric data (e.g., metadata, hand-crafted attributes, etc.). It is further noted that image data can include data related to one or more of the following: a processing step of interest, a layer of interest, a plurality of processing steps, and/or a plurality of layers of the specimen.

According to certain embodiments of the presently disclosed subject matter, the examination system 100 comprises a computer-based system 101 operatively connected to the examination tools 120 and capable of performing image denoising and/or automatic metrology operations based on runtime images of a specimen obtained during specimen fabrication.

Specifically, system 101 includes a processor and memory circuitry (PMC) 102 operatively connected to a hardware-based I/O interface 126. The PMC 102 is configured to provide processing necessary for operating the system, as further detailed with reference to FIGS. 2-5, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

According to certain embodiments of the presently disclosed subject matter, system 101 can be an image denoising system configured to perform image denoising for runtime low SNR images using a trained machine learning (ML) model. In such cases, one or more functional modules comprised in the PMC 102 of system 101 can include a machine learning (ML) model 108 that was previously trained for processing a low SNR image and generating a corresponding high SNR image.

Specifically, the PMC 102 can be configured to obtain, via an I/O interface 126, a runtime image of the semiconductor specimen with a low SNR, and provide the runtime image as an input to a machine learning model (e.g., the ML model 108) to process. The ML model 108 can generate an output image with a high SNR (relatively higher with respect to the low SNR). The ML model 108 is previously trained during setup using a training set, as will be described below.

In such cases, the ML model 108 can be regarded as part of a metrology recipe usable for assisting runtime metrology operations on acquired runtime images. Details of the runtime image denoising process are described below with reference to FIGS. 3 and 8.

In some embodiments, system 101 can be configured as a training system capable of training the ML model during a training/setup phase using a specific training set. In such cases, one or more functional modules comprised in the PMC 102 of system 101 can include a training set generator 104, a training module 106, and a ML model 108. Specifically, the training set generator 104 can be configured to generate a training set comprising a plurality of low SNR images respectively associated with the same high SNR image. The plurality of low SNR images correspond to a plurality of sequences of frames acquired by an examination tool in a plurality of runs of scanning a first site of the semiconductor specimen. The high SNR image is generated based on the plurality of low SNR images. The training module 106 can be configured to train the ML model 108 using the training set. Specifically, the training can comprise, for each low SNR image: processing the low SNR image by the ML model to obtain predicted image data, and optimizing the ML model based on the predicted data and the high SNR image.

As described above, the ML model, upon being trained, is usable for generating a high SNR image for a runtime low SNR image. Details of the training process are described below with reference to FIGS. 2 and 4-8.

Operation of systems 100 and 101, the PMC 102, and the functional modules therein will be further detailed with reference to FIGS. 2-5.

According to certain embodiments, the ML model 108 referred to herein can be implemented as various types of machine learning models, such as, e.g., decision tree, Support Vector Machine (SVM), Artificial Neural Network (ANN), regression model, Bayesian network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model can be implemented as a deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a ML model can be initially selected prior to training, and can be further iteratively adjusted or modified during training to achieve an optimal set of weighting and/or threshold values in a trained model. A set of input data used to adjust the weights/thresholds of a ML model is referred to as a training set.

It is noted that the teachings of the presently disclosed subject matter are not bound by specific architecture of the ML model as described above.

In some cases, additionally to system 101, the examination system 100 can comprise one or more examination modules, such as, e.g., metrology operation module, defect detection module, Automatic Defect Review Module (ADR), Automatic Defect Classification Module (ADC), and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the generated high SNR image, can be provided to the one or more examination modules for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the runtime image(s), the training set, as described above. Accordingly, these input data can be retrieved from the storage unit 122 and provided to the PMC 102 for further processing. The output of the system 101, such as the generated high SNR image, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, etc. The user may be provided, through the GUI, with options of defining certain operation parameters. The user may also view the operation results or intermediate processing results, such as, e.g., the generated high SNR image with respect to the input low SNR, etc., on the GUI. In some cases, system 101 can be further configured to send certain output to the storage unit 122, and/or external systems (e.g., Yield Management System (YMS) of a fabrication plant (FAB)).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned components and functional modules shown in FIG. 1 can be distributed over several local and/or remote devices, and can be linked through a communication network. By way of example, the examination tool 120 and the system 101 can be located at the same entity (in some cases hosted by the same device) or distributed over different entities. By way of another example, as described above, in some cases, system 101 can be configured as a training system for training the ML model, while in some other cases, system 101 can be configured as a runtime image denoising system using the trained ML model. The training system and the runtime examination system can be located at the same entity (in some cases hosted by the same device), or distributed over different entities, depending on specific system configurations and implementation needs.

It is further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-5. Likewise, the methods described with respect to FIGS. 2-5 and their possible implementations can be implemented by systems 101 and 100. It is therefore noted that embodiments discussed in relation to the methods described with respect to FIGS. 2-5 can also be implemented, mutatis mutandis, as various embodiments of the systems 101 and 100, and vice versa.

Figure 2:
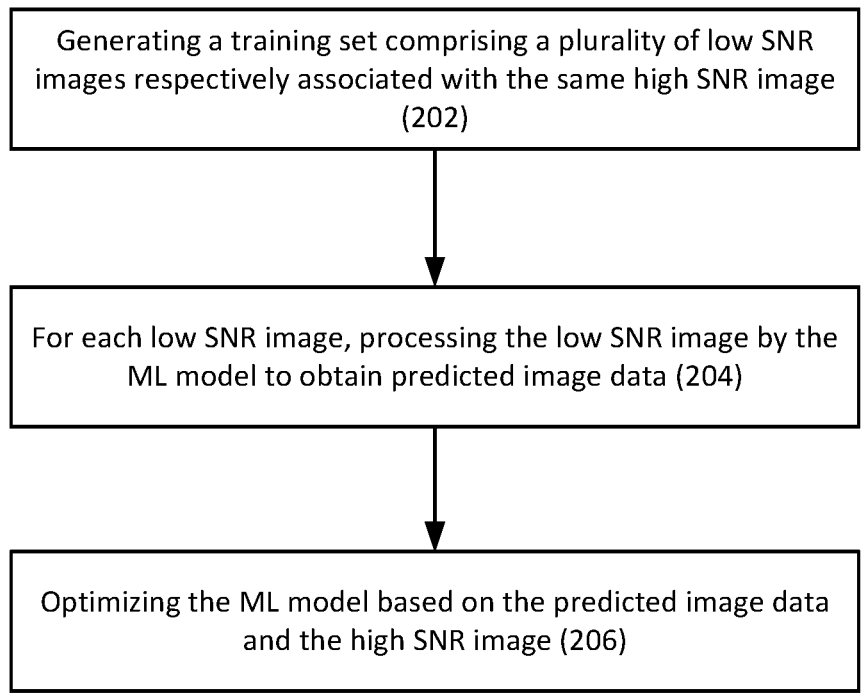
FIG. 2 illustrates a generalized flowchart of training a machine learning model usable for image denoising in accordance with certain embodiments of the presently disclosed subject matter.

Referring to FIG. 2, there is illustrated a generalized flowchart of training a machine learning model usable for image denoising in accordance with certain embodiments of the presently disclosed subject matter.

As described above, the ML model referred to herein can be implemented as various types of machine learning models. In some embodiments, the ML model can be trained based on supervised learning. Supervised learning generally refers to training a learning model on input data that has been labeled for a particular output. The model is trained until it can detect the underlying patterns and relationships between the input data and the output labels, enabling it to yield accurate labeling results when presented with runtime data which the model has never seen before. In such cases, the ML model can be implemented as various models, such as, e.g., Convolutional Neural Network (CNN), Support vector machine (SVM), decision trees, etc., with supervised learning mode.

For training a ML model in supervised learning, a labeled training set is required. According to certain embodiments of the present disclosure, a training set can be generated (202) (e.g., by the training set generator 104 in PMC 102), comprising a plurality of low SNR images respectively associated with the same high SNR image. The plurality of low SNR images (e.g., relatively lower with respect to the high SNR) correspond to a plurality of sequences of frames acquired by an examination tool in a plurality of runs of scanning a first site of the semiconductor specimen. The high SNR image (e.g., relatively higher with respect to the low SNR) is generated based on the plurality of low SNR images. The high SNR image serves as the ground truth data associated with each low SNR image of the plurality of low SNR images. The ML model is trained to learn the non-linear mapping relationship between the two populations of low SNR images and high SNR images.

It is to be noted that the low SNR and high SNR used herein can be defined with respect to each other, e.g., as long as the low SNR is relatively lower than the high SNR, and the high SNR is relatively higher than the low SNR. In some cases, the low SNR and high SNR can also be regarded as being defined with respect to a threshold which may be a predetermined SNR level pertaining to a specific examination application (e.g., a SNR that is sufficient for the application to meet performance requirements with respect to, e.g., precision, sensitivity, accuracy, or throughput, etc.).

Figure 4:
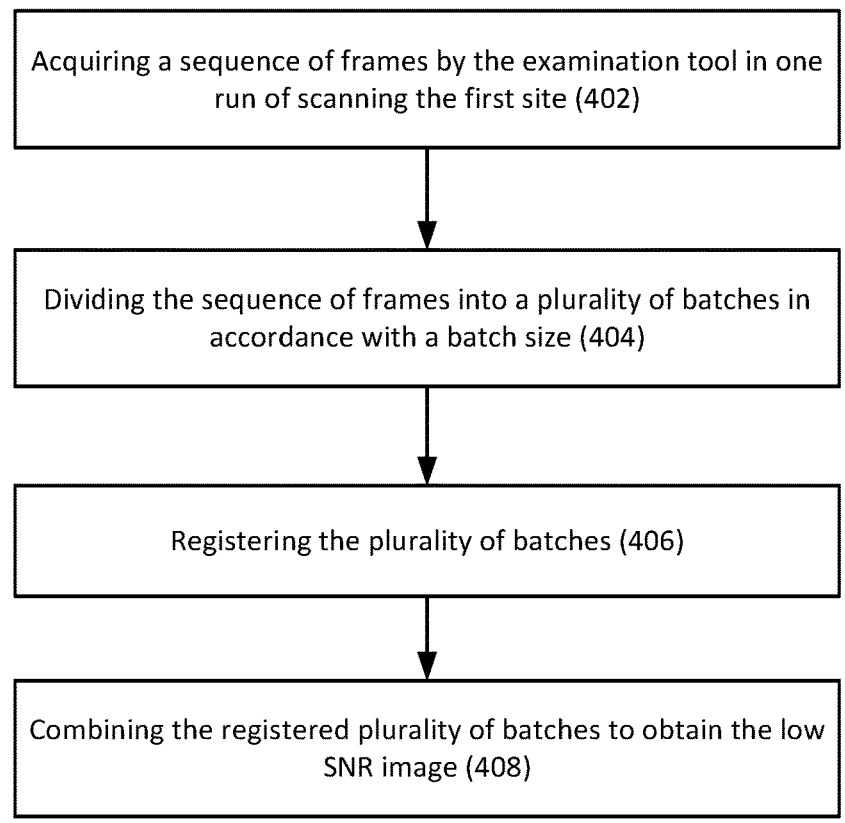
FIG. 4 is a generalized flowchart of generating a low SNR image of the plurality of low SNR images in accordance with certain embodiments of the presently disclosed subject matter.

Referring now to FIG. 4, there is illustrated a generalized flowchart of generating a low SNR image of the plurality of low SNR images in accordance with certain embodiments of the presently disclosed subject matter.

A sequence of frames can be acquired (402) by the examination tool (e.g., the examination tool 120 such as a SEM) in one run of scanning a site (also referred to as a first site, to differentiate from a second site or one or more additional sites as described below) on the specimen. The term "site" refers to an area to be examined on the specimen. The term "one run" or "single run" refers to scanning a site on the specimen by the examination tool and sequentially capturing a series of frames of the site with one burst, without removing the specimen from the tool and re-placing it. Multiple runs, or a plurality of runs, refers to scanning the same site while removing and re-placing the specimen on the tool between different runs, thereby introducing physical effects such as navigation errors on the acquired images. A sequence of frames 602 acquired in one run of scanning a site is exemplified in FIG. 6.

The sequence of frames can be divided (404) (e.g., by an image processing module in the training set generator 104 in PMC 102) into a plurality of batches in accordance with a batch size. The plurality of batches can be registered (406), giving rise to a registered plurality of batches. Image registration can be performed for the purpose of correcting misalignment between the batches of frames. As the frames are sequentially captured within one run of scanning the same site (i.e., the specimen is not removed and re-placed relative to the tool), navigation error and tool drifts are supposed to be minimal. In such cases, registration can be performed, e.g., to determine geometric transformation parameters representative of a projective transformation between two batches of images, including one or more of translation, rotation, scaling, shear mapping, etc., and any combination thereof in any sequence. The registered plurality of batches can be combined (408) to obtain a low SNR image, e.g., by averaging the registered plurality of batches.

As illustrated in FIG. 6, the sequence of frames 602 are divided (604) into n batches. The batch size (i.e., the number of frames in each batch) can be any dividable integers with respect to the number of frames in the plurality of batches. In some embodiments, the batch size can be specifically selected (from the dividable integers) such that the averaged (e.g., mean, median, or any other averaging techniques) correlation between the registered plurality of batches meets a predetermined threshold (i.e., a correlation threshold).

By way of example, assume the sequence of frames include 24 frames. The batch size candidates include 1, 2, 3, 4, 6, 8, and 12 frames per batch. In order to find the batch size that meets the correlation threshold, an iterative selection process can be performed. For instance, a size candidate, e.g., 2 frames per batch, can be first selected and the sequence of 24 frames are divided into 12 batches (n=12). The two frames in each batch are combined into an averaged frame. The 12 batches are registered, e.g., the batches 2-12 are all registered to the first batch. The correlation between the registered batches can be calculated (e.g., by calculating correlation between each two batches, and then averaging all the correlation values) and compared to a predetermined threshold. If the threshold is not met, the next size candidate, e.g., 3 frames per batch, can be selected, and the above process can be repeated, until the batch size selected enables the correlation to meet the correlation threshold.

Dividing the sequence of frames into batches and performing registration between the batches, instead of registration directly at the frame level, can reduce the registration error caused by the low quality of each single frame, and improve the accuracy of the generated low SNR image. In addition, as the batch size can affect the registration validity, it is proposed in the present disclosure the batch size is specifically selected (e.g., the iterative selection process as described above) such that the registered batches meet a correlation threshold. Such specific selection configuration can ensure that the sequence of frames is properly divided so as to improve the level of registration accuracy, thereby further enhancing the quality of the generated low SNR image.

As shown in FIG. 6, once the batch size is selected, the n batches are created. The n batches are registered and then combined (e.g., averaged) (606), giving rise to a low SNR image 608 corresponding to the sequences of frames 602 acquired in one run of scanning the first site.

It is to be noted that the low SNR image 608 is generated based on all the frames in the sequence of frames 602. There is no need to exclude the first few frames at the beginning of the sequence, where shrinkage occurs and the effect thereof is more obvious, and/or the last few frames at the end of the sequence, where charging is continuously accumulated and the effect thereof is more significant. By using all the frames from the sequence of frames captured during one run for generating the low SNR image, the ML model learns to generalize the image artifacts in certain frames caused by such physical effects, thereby capable of generating, for a given runtime input image, an output high SNR image targeting precision improvement, taking into consideration any image artifacts in the runtime input image that are caused by such physical effects.

In some cases, the high SNR image can be generated using some of the frames in the plurality of sequences of frames used to generate the plurality of low SNR images. By way of example, assume n low SNR images are generated based on n sequences of frames acquired in n runs of scanning. The high SNR image can be generated by excluding some of the frames in the n sequences of frames. For instance, a new first low SNR image can be generated using the first sequence of frames where a number of frames at the beginning of the sequence is excluded (where the effect of shrinkage is obvious). Similarly, a new $n_{th}$ low SNR image can be generated using the $n_{th}$ sequence of frames where a number of frames at the end of the sequence is excluded (where the effect of charging is significant). In such ways, the generated high SNR image possesses less image artefacts caused by such physical effects, thus providing a cleaner and more accurate ground truth.

Similarly, one or more additional sequences of frames can be acquired by the tool in one or more additional runs of scanning the same first site, and one or more additional low SNR images can be created in a similar manner as described with reference to FIG. 6.

Upon the plurality of low SNR images being generated, a high SNR image can be generated based on the plurality of low SNR images, as will be described in further detail with reference to FIGS. 5 and 7.

Figure 5:
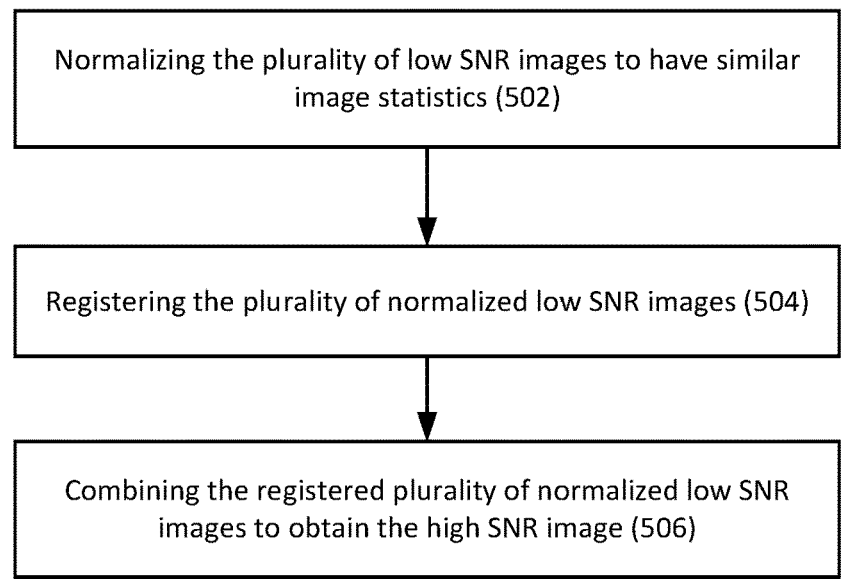
FIG. 5 is a generalized flowchart of generating a high SNR image based on the plurality of low SNR images in accordance with certain embodiments of the presently disclosed subject matter.

Referring now to FIG. 5, there is illustrated a generalized flowchart of generating a high SNR image based on the plurality of low SNR images in accordance with certain embodiments of the presently disclosed subject matter.

The plurality of low SNR images can be normalized (502) (e.g., by an image processing module in the training set generator 104 in PMC 102) to have similar image statistics (e.g., as of the first low SNR image). As shown in FIG. 7, for each low SNR image, image statistics, such as, e.g., mean (µ) and standard deviation (a), can be calculated. The image statistics of the low SNR images 2-n can be normalized to similar statistics as of low SNR image 1. The normalization between the low SNR images can effectively correct color variation between the images, which may be caused by certain physical effects of the scanning process, such as, e.g., charging effects, carbonization, damage to the specimen over time, and different physical configurations and calibrations of the examination tools etc.

As shown in FIGS. 5 and 7, the plurality of normalized low SNR images can be registered (504). For instance, the normalized low SNR images 2-n can all be registered with low SNR image 1. Image registration can be performed for the purpose of correcting misalignment between the normalized low SNR images.

In some cases, image registration between the low SNR images can comprise global registration and/or local registration. The global registration aims to address misalignment caused by various factors, such as, e.g., navigation errors of the tool (between different runs), drifts caused by certain physical effects such as charging effects and/or by shrinkage of the specimen, etc. The global registration can be performed according to any suitable registration algorithms known in the art. By way of example, the global registration can be performed by determining geometric transformation parameters representative of a projective transformation, including one or more of translation, rotation, scaling, shear mapping, etc., and any combination thereof in any sequence.

The local registration aims to address misalignment caused by various variations between the images, such as, e.g., process variations. By way of example, in some cases, the registration can be performed using one or more of the following registration algorithms: an area-based algorithm, feature based registration, or phase correlation registration. An example of an area-based method is registration using optical flows such as the Lucas-Kanade (LK) algorithm, or Horn and Schunk algorithm. Feature based methods are based on finding distinct informative points ("features") in two images, and calculating the needed transformation between each pair, based on correspondence of the features. This allows for an elastic registration (i.e., non-rigid registration), where different areas are moved separately.

The registered plurality of normalized low SNR images can be combined (506) to obtain a high SNR image. For instance, the registered n normalized low SNR images can be averaged (704), giving rise to the high SNR image 702.

As shown, the plurality of low SNR images 1-n all correspond to the same high SNR image 702 which serves as ground truth for each of the normalized low SNR images. It is noted that there may be certain variations between the plurality of normalized low SNR images (which are captured in different runs of scanning the same site) caused by: different variations such as process variation and color variation, physical effects such as shrinkage and charging effects, as well as navigation error and tool drifts etc. The training set is configured such that all the low SNR images are associated with the same ground truth high SNR image, thereby ensuring that the ML model trained using such training set is capable of predicting a similar high SNR image, given different input images with such variations. The measurements derived from such a high SNR image therefore have improved precision, even when compared to measurements obtained from previous runtime images captured with relatively higher electron doses (e.g., with a larger number of frames and long acquisition time).

Referring back to FIG. 2, once the training set is generated, as described above with respect to FIGS. 4-7, the training set can be used for training a ML model for image denoising. The training of the ML model can comprise, for each low SNR image: processing (204) the low SNR image by the ML model (e.g., by the ML model 108 in PMC 102) to obtain predicted image data, and optimizing (206) (e.g., by the training module 106 in PMC 102) the ML model based on the predicted data and the high SNR image.

Figure 8:
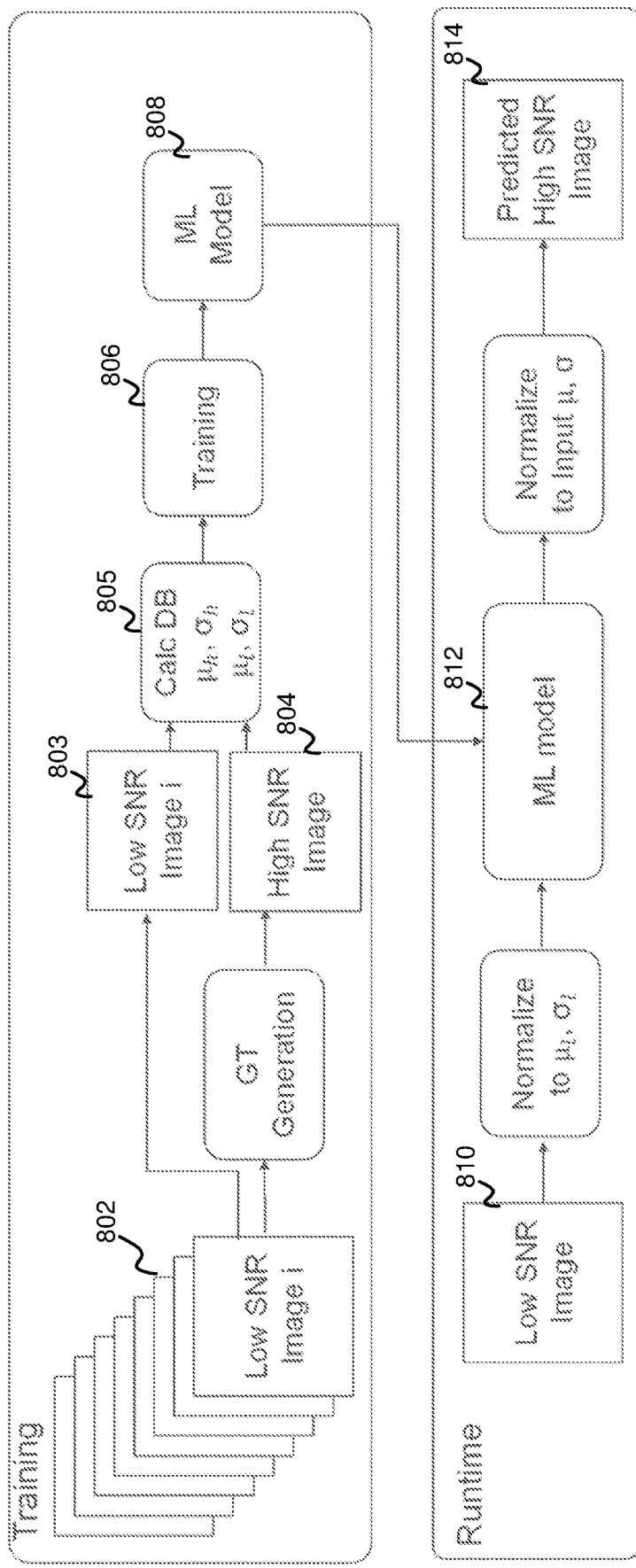
FIG. 8 shows a schematic illustration of an exemplary training process of the ML model and an exemplary runtime generation of a high SNR image using the ML model in accordance with certain embodiments of the presently disclosed subject matter.

FIG. 8 shows a schematic illustration of an exemplary training process of the ML model in accordance with certain embodiments of the presently disclosed subject matter.

As illustrated, a plurality of low SNR images 802 are generated, each corresponding to a respective sequence of frames, as described with reference to FIG. 6. The low SNR images 802 are used to generate the ground truth (GT) data, i.e., the high SNR image 804, as described with reference to FIG. 7. Each low SNR image i 803 from the plurality of low SNR images 802 and the high SNR image 804 form an image pair used to train the ML model. In some cases, the image statistics (such as, e.g., mean $\mu_l$ and standard deviation $\sigma_l$, etc.) of the plurality of low SNR images, can be calculated (805) and stored during the training. As will be described in further detail below, in cases where the training set comprises low SNR images and high SNR images from multiple sites on the specimen, image statistics of the low SNR images from the multiple sites can be calculated and normalized to similar image statistics ($\mu_l$, $\sigma_l$), and image statistics of the high SNR images from the multiple sites can be calculated and normalized to similar image statistics ($\mu_h$, $\sigma_h$). In cases where the training set comprises low SNR images and high SNR images acquired from multiple sites and multiple perspectives on the specimen, image statistics of the low SNR images of the multiple sites from each perspective can be calculated and normalized to similar image statistics ($\mu_l$, $\sigma_l$), and image statistics of the high SNR images of the multiple sites from each perspective can be calculated and normalized to similar image statistics ($\mu_h$, $\sigma_h$).

During training 806, the low SNR image i 803 in each pair is fed into the ML model 808 to be processed. The output of the ML model 808 is predicted image data. The ML model can be configured in different ways and the predicted image data can vary accordingly. By way of example, in some cases, the ML model can be configured to produce a predicted high SNR image. The predicted high SNR image is evaluated with respect to the ground truth high SNR image 804 using a loss function (also referred to as cost function). For instance, the loss function can be a difference metric configured to represent a difference between the predicted image and the high SNR image 804, such as, e.g., Mean squared error (MSE), Sum of absolute difference (SAD), structural similarity index measure (SSIM), etc. The ML model 808 can be optimized by minimizing the value of the loss function. It is to be noted that the term "minimize" or "minimizing" used herein refers to an attempt to reduce a difference value represented by the loss function to a certain level/extent (which can be predefined), but it does not necessarily have to reach the actual minimum.

By way of another example, in some cases, the ML model can be configured to produce predicted noise between a predicted high SNR image and the low SNR image i. In such cases, the predicted noise is evaluated with respect to the actual noise between the low SNR image and the high SNR image (as the ground truth) using a loss function. The ML model can be optimized using a loss function representative of a residual between the predicted noise and the actual noise, such as, e.g., Least Absolute Error (L1), Least Square Errors (L2), Huber loss, etc.

As described above, the ML model 808 can be implemented as various supervised learning models. In one example, the ML model can be implemented as a convolutional neural network (CNN). CNN normally has a structure comprising an input and an output layer, as well as multiple hidden layers. The hidden layers of a CNN typically comprise a series of convolutional layers that convolve with a multiplication or other dot product, subsequently followed by additional layers such as pooling layers, fully connected layers, and batch normalization layers, etc. In some cases, a CNN can be regarded as being composed of two main functionalities: feature extraction and classification. By way of example, the feature extraction part can include several convolutional layers followed by max-pooling and an activation function. The classification part usually includes fully connected layers. By way of example, in some cases, certain intermediate layers (e.g., one or more of the convolutional layers) in the feature extraction part of the supervised model can provide layer output in the form of feature maps (also termed as feature vectors). For instance, the output feature maps can be generated, e.g., by convolving each filter of a specific layer across the width and height of the input feature maps, computing the dot product between the entries of the filter and the input, and producing a two-dimensional activation map which gives the responses of that filter at every spatial position. Stacking the activation maps for all filters along the depth dimension forms the full output feature maps of the convolution layer. As a result, the CNN learns of filters that activate when it detects some specific type of feature at some spatial position in the input.

Training of the CNN can be performed by iteratively adjusting the weights and/or threshold values of the CNN using back propagation during each batch, so that the prediction tries to match the ground truth (i.e., the loss function is minimized to a certain level/threshold or the training is performed for a predefined number of epochs). After the weight adjustment in each batch, the CNN improves in terms of prediction accuracy, and eventually it achieves an optimal set of weights in a trained model.

In some embodiments, the plurality of low SNR images as described above are acquired from a first detection perspective of the examination tool. The training set can further comprise a second plurality of low SNR images acquired from a second detection perspective of the examination tool, and a second high SNR image generated based on the second plurality of low SNR images. By way of example, the different perspectives can refer to external and internal perspectives (also referred to as secondary electron (SE) and backscattered electron (BSE) perspectives) of a SEM tool. In such cases, the low SNR images 802 as illustrated in FIG. 8 represent both the first and the second plurality of low SNR images acquired from different detection perspectives, and the ML model trained using such training set is capable of processing runtime images acquired from the first detection perspective and the second detection perspective.

It is to be noted that the term "precision" used herein refers to a metrology benchmark/metric representing the closeness of agreement between independent measurements (by the same tool) on the same feature of a specimen. By way of example, good precision indicates that the independent measurements of the same feature are repeatable (i.e., the measurements have small variance with one another and the measurement distribution is relatively close). In some embodiments, precision can be regarded as measurement repeatability. Repeatability refers to a measure of measurement result distribution, where consecutive measurements are conducted repeatedly on the same site of the specimen, without any operator intervention. The cause for variation within repeated measurement results can be mainly due to the statistical nature of the tool signal (e.g., SEM signal), and the interpretation of the new set of signals by the measurement algorithm as comprised in the recipe. In some other embodiments, precision can comprise two components: repeatability and reproducibility. Reproducibility refers to another measure of measurement result distribution, where the measurements are obtained from different sites of the same specimen at different times. It accounts for the other sources of variation between independent measurements: wafer alignment, SEM autofocus, pattern recognition, tool stability etc.

According to certain embodiments, in cases where the precision metric is evaluated with respect to both repeatability (with respect to measurements of the same site) and reproducibility (with respect to measurements of different sites of the same specimen), the training set can comprise low SNR images acquired from different sites of the specimen. By way of example, in addition to the plurality of low SNR images acquired from the first site of the specimen, the training set can further comprise a second plurality of low SNR images acquired from a second site of the semiconductor specimen and a corresponding second high SNR image, which are generated in a similar manner as described with respect to FIGS. 4-7. The second site is a different site from the first site. The two sites contain the same feature (i.e., share the similar design pattern). Specifically, the second plurality of low SNR images correspond to a second plurality of sequences of frames acquired by the examination tool in a second plurality of runs of scanning the second site. The second high SNR image is generated based on the second plurality of low SNR images.

In such cases, the low SNR images 802 represent the first and second plurality of low SNR images. The high SNR image 804 represents the first and second high SNR images. In some cases, the second plurality of low SNR images and the first plurality of low SNR images can be normalized to have similar image statistics, and the first high SNR image and the second high SNR image can be normalized to have similar image statistics (as illustrated in block 805), prior to the training.

In some embodiments, one or more additional low SNR images can be acquired from one or more additional sites of the specimen. By way of example, the sites can be selected to reflect the inhomogeneity across the specimen. In one example, n sites can be selected from n dies on a wafer, each site containing the same feature. For each of the n sites, m low SNR images can be acquired from m runs of scanning the site, thereby giving rise to a total of m*n low SNR images and n corresponding high SNR images.

In some further embodiments, the low SNR images can be acquired from k detection perspectives for n sites of the specimen. For each site, m low SNR images can be acquired from m runs of scanning the site. In such cases, the training set can comprise m*n*k low SNR images and n*k corresponding high SNR images.

Optionally, once the ML model is trained, it can be tested and validated using additional datasets. If the prediction performance during test and validation meets the requirements, the trained ML model can be then deployed in runtime for image denoising.

Figure 3:
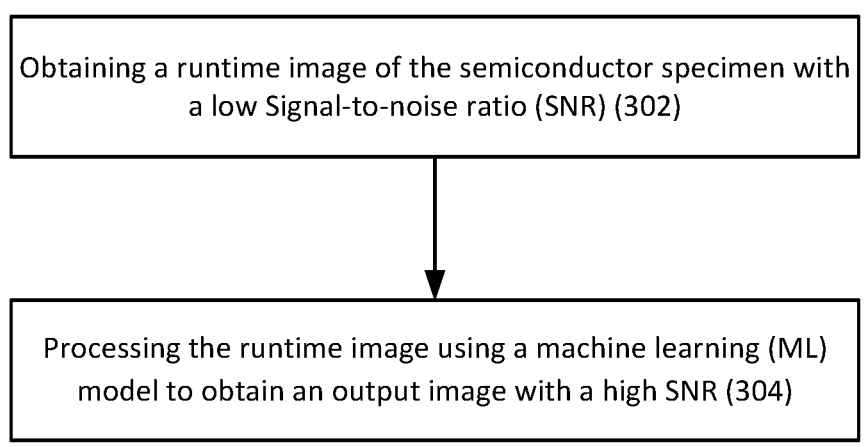
FIG. 3 is a generalized flowchart of runtime generation of a high SNR image using a machine learning model trained for image denoising in accordance with certain embodiments of the presently disclosed subject matter.

Turning now to FIG. 3, there is illustrated a generalized flowchart of runtime generation of a high SNR image using a machine learning model trained for image denoising in accordance with certain embodiments of the presently disclosed subject matter.

A runtime image of a semiconductor specimen can be obtained (302) (e.g., by the examination tool 120) during runtime examination of the specimen. The runtime image has a low signal-to-noise ratio (SNR) (e.g., relatively lower with respect to a high SNR as described herein). By way of example, the runtime image can be acquired by an electron beam tool, such as, e.g., SEM.

The runtime image can be provided as an input to a machine learning model (e.g., the ML model 108 in PMC 102) to process (304). Upon processing the runtime image, the ML model can provide an output image with a high SNR (e.g., relatively higher with respect to the low SNR). The ML model is previously trained during setup using a training set comprising a plurality of low SNR images respectively associated with a same high SNR image (which serves as the ground truth thereof). The plurality of low SNR images correspond to a plurality of sequences of frames acquired by an examination tool in a plurality of runs of scanning a first site of the semiconductor specimen. The high SNR image is generated based on the plurality of low SNR images. The training set generation, including the low SNR images and the high SNR image, is described in detail above with reference to FIGS. 2 and 4-7. As described above, the ML model can be implemented using various learning models.

It is to be noted that the runtime image is acquired in a similar imaging condition as of the low SNR images in the training set (in terms of electron dose, number of frames, etc.), such that the SNR level of the runtime image is the same/similar (e.g., being identical, or similar to, or highly correlated with) as the SNR level of the training low SNR image. It is to be noted that the low SNR of the training image and the low SNR of the runtime image can be similar to a certain extent, and do not have to be exactly the same. Various similarity measures and algorithms can be used for determining the extent/level of equivalence/similarity therebetween.

In some embodiments, metrology operations can be performed (e.g., by a metrology module (not illustrated) in PMC 102) on the generated high SNR image for the purpose of obtaining various measurements, such as, e.g., CD measurements.

FIG. 8 further shows a schematic illustration of an exemplary runtime generation of a high SNR image using the ML model in accordance with certain embodiments of the presently disclosed subject matter.

The ML model 808, upon being trained, is deployed in runtime (as indicated by the arrow from the ML model 808 in the training phase to the ML model 812 in the runtime phase). A runtime image 810 with a low SNR is obtained when examining a specimen. In some embodiments, the runtime image 810 can be normalized to have similar image statistics as of the plurality of the low SNR images (e.g., mean µi and standard deviation aI), before being fed into the trained and deployed ML model 812 to process. The ML model 812 processes the normalized runtime image, and provides an output image. The output image is again normalized to have similar image statistics (e.g., mean µ and standard deviation σ) as of the input runtime image, giving rise to a final output image 814 with a high SNR.

Having the image statistics of the runtime image transformed to similar image statistics of the plurality of low SNR images can enable the ML model to perform runtime prediction in a similar condition to that in which it was trained, thereby maximizing the prediction performance. Having the image statistics of the output image from the ML model transformed back to the original statistics of the runtime image can produce a high SNR image having matching gray level statistics with respect to the input runtime image.

As described above with reference to FIG. 2, the plurality of low SNR images in the training set correspond to a plurality of sequences of frames acquired by an examination tool in a plurality of runs of scanning a first site. This is also referred to as a "multi-run" scenario. Certain embodiments of the presently disclosed subject matter also encompass a "single-run" scenario, as will be described below in further detail.

In the single-run scenario, a sequence of frames can be acquired by the examination tool in a single run of scanning a first site (e.g., with a relatively long burst resulting a relatively large number of frames). The sequence of frames can be divided into a plurality of batches in accordance with a batch size. The plurality of batches can be registered, and the registered plurality of batches can be combined (e.g., averaged) to obtain a high SNR image. The division into batches, registration between batches, and combining the registered batches, can be performed in a similar manner as described above with reference to FIGS. 4 and 6, with one difference that the resulting image here is used as a high SNR image (since it results from a relatively large number of frames), not a low SNR image.

The sequence of frames can be divided into a plurality of subsets, each subset comprising a number of frames (e.g., n frames). The n frames in each subset can be combined to obtain a respective low SNR image, giving rise to a plurality of low SNR images. The plurality of low SNR images are associated with the same high SNR image as generated above. A training set can include a plurality of image pairs each including a low SNR image and the high SNR image, where the high SNR image serves as ground truth for the low SNR image. Similarly, one or more additional pluralities of image pairs can be acquired for one or more additional sites of the specimen. In one embodiment, the training set can comprise images pairs acquired from a plurality of sites of the specimen.

The ML model can be trained during setup using the training set. By way of example, the low SNR image in each pair is fed into the ML model to be processed. The output of the ML model is predicted image data. Similarly, as described above, the ML model can be configured in different ways, and the predicted image data can vary accordingly. By way of example, in some cases, the ML model can be configured to produce a predicted high SNR image. The predicted high SNR image is evaluated with respect to the ground truth high SNR image using a loss function. By way of another example, the ML model can be configured to produce predicted noise between a predicted high SNR image and the low SNR image. In such cases, the predicted noise is evaluated with respect to the actual noise between the low SNR image and the high SNR image using a loss function. The ML model can be optimized using a loss function representative of a residual between the predicted noise and the actual noise. The ML model can be optimized by minimizing the value of the loss function.

It is to be noted that examples illustrated in the present disclosure, such as, e.g., the registration techniques, the exemplified ML models and training process thereof, the exemplified sites and perspectives, etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein is providing a ML model capable of image denoising, i.e., given an input of a runtime low SNR image, the trained ML model can process it and generate a corresponding high SNR image with significantly improved SNR level. The generated high SNR image can be used for performing metrology operations, instead of using an actual high SNR image captured by the examination tool which typically requires long image acquisition time and also causes undesired physical effects on the specimen such as, e.g., shrinkage and charging effects.

The proposed system enables the examination tool to only capture a low SNR image thus significantly reducing the image acquisition time of the examination tool and improving the throughput. In addition, the generated high SNR image has good quality, such that the measurements derived therefrom have improved precision with respect to the input low SNR image. In some cases, the measurements even have improved precision as compared to measurements obtained from previous runtime images captured with relatively higher electron doses (e.g., with a larger number of frames and long acquisition time).

Among further advantages of certain embodiments of the presently disclosed subject matter as described herein is training the ML model in supervised learning using specifically configured training set comprising a plurality of low SNR images associated with the same ground truth high SNR image, thereby ensuring that the ML model trained using such training set is capable of predicting a similar high SNR image, given different input low SNR images on unseen sites (unseen during training) with variations (which may be caused by process variation and color variation, physical effects such as shrinkage and charging effects, as well as navigation error and tool drifts etc.). Generating a similar high SNR image for various input low SNR images ensures that the measurements derived therefrom have improved precision performance.

Among further advantages of certain embodiments of the presently disclosed subject matter as described herein is each low SNR image in the training set is generated based on all the frames in a sequence of frames acquired in one run, without excluding the first few frames at the beginning of the sequence, where shrinkage occurs and the effect thereof is more obvious, and/or the last few frames at the end of the sequence, where charging is continuously accumulated and the effect thereof is more significant. By using all the frames from the sequence of frames captured during one run for generating the low SNR image, the ML model learns to generalize the image artifacts caused by such physical effects, and is thereby capable of generating, for a given runtime input image, an output high SNR image targeting precision improvement, taking into consideration the image artifacts in the runtime input image that are caused by such physical effects.

Among further advantages of certain embodiments of the presently disclosed subject matter as described herein is transforming/normalizing the image statistics of the runtime image to similar image statistics of the training low SNR images, which enables the ML model to perform runtime prediction in a similar condition to that in which it was trained, thereby maximizing the prediction performance. In addition, the image statistics of the output image from the ML model are transformed back to the original statistics of the runtime image, thereby producing a high SNR image having matching gray level statistics with respect to the input runtime image.

Among further advantages of certain embodiments of the presently disclosed subject matter as described herein is dividing the sequence of frames into batches and performing registration between the batches, instead of registration directly at the frame level, which significantly reduces the registration error caused by the low quality of each single frame, and improves the sharpness of the generated low SNR image. In addition, the batch size can be specifically selected such that the registered batches meet a correlation threshold, which ensures the sequence of frames is properly divided so as to guarantee the level of registration accuracy, thereby further enhancing the quality of the generated low SNR image.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. An image generation system, the system comprising a processing and memory circuitry (PMC) configured to:
    obtain a runtime image of a semiconductor specimen with a low Signal-to-noise ratio (SNR); and
    process the runtime image using a machine learning (ML) model to obtain an output image with a high SNR relatively higher with respect to the low SNR, wherein the ML model is previously trained during setup using a training set comprising a plurality of low SNR images respectively associated with a same high SNR image, the plurality of low SNR images respectively generated from a plurality of sequences of frames acquired by an examination tool in a plurality of runs of scanning a first site of the semiconductor specimen, the high SNR image generated based on the plurality of low SNR images and used as ground truth data for each low SNR image of the plurality of low SNR images, and
    wherein the training of the ML model comprises, for each low SNR image: processing the low SNR image by the ML model to obtain predicted image data, and optimizing the ML model based on the predicted image data and the high SNR image.

2. The image generation system according to claim 1, wherein each low SNR image in the plurality of low SNR images is generated by:
    acquiring a sequence of frames by the examination tool in one run of scanning the first site;
    dividing the sequence of frames into a plurality of batches in accordance with a batch size;
    registering the plurality of batches; and
    combining the registered plurality of batches to obtain the low SNR image.

3. The image generation system according to claim 2, wherein the batch size is specifically selected such that a correlation between the registered plurality of batches meets a predetermined threshold.

4. The image generation system according to claim 2, wherein the low SNR image is generated using all frames in the sequence of frames, such that the ML model, upon being trained, is capable of generating, for a given runtime image, an output image with improved precision, taking into consideration one or more image artifacts in the given runtime image that are caused by one or more physical effects on the semiconductor specimen.

5. The image generation system according to claim 1, wherein the high SNR image is generated by:
   normalizing the plurality of low SNR images to have similar image statistics;
   registering the plurality of normalized low SNR images, giving rise to a registered plurality of normalized low SNR images; and
   combining the registered plurality of normalized low SNR images to obtain the high SNR image.

6. The image generation system according to claim 5, wherein the PMC is configured to: upon obtaining the runtime image, normalize the runtime image to have similar image statistics as of the plurality of low SNR images, and process the normalized runtime image using the ML model; and upon obtaining the output image, normalize the output image to have similar image statistics as of the runtime image, wherein image statistics of the plurality of low SNR images are calculated and stored during the training.

7. The image generation system according to claim 1, wherein the predicted image data is predicted noise between a predicted high SNR image and the low SNR image, and wherein the ML model is optimized using a loss function representative of a residual between the predicted noise and an actual noise between the low SNR image and the high SNR image.

8. The image generation system according to claim 1, wherein the predicted image data is a predicted high SNR image, and wherein the ML model is optimized using a loss function representative of a difference between the predicted high SNR image and the high SNR image.

9. The image generation system according to claim 1, wherein the plurality of low SNR images are acquired from a first detection perspective of the examination tool, and the training set further comprises a second plurality of low SNR images acquired from a second detection perspective of the examination tool, and a second high SNR image generated based on the second plurality of low SNR images, and wherein the trained ML model is capable of processing runtime images acquired from the first detection perspective and the second detection perspective.

10. The image generation system according to claim 1, wherein the training set further comprises a second plurality of low SNR images corresponding to a second plurality of sequences of frames acquired by the examination tool in a second plurality of runs of scanning a second site of the semiconductor specimen, and a second high SNR image generated based on the second plurality of low SNR images, wherein a first plurality of low SNR images and the second plurality of low SNR images are normalized to have similar image statistics, and a first high SNR image and the second high SNR image are normalized to have similar image statistics, prior to the training, and wherein the output image with a high SNR as generated by the ML model is usable for obtaining measurements with improved precision.

11. A method of training a machine learning (ML) model for image generation, the method comprising:
   generating a training set comprising a plurality of low Signal-to-noise ratio (SNR) images respectively associated with a same high SNR image, the plurality of low SNR images respectively generated from a plurality of sequences of frames acquired by an examination tool in a plurality of runs of scanning a first site of a semiconductor specimen, the high SNR image generated based on the plurality of low SNR images and used as ground truth data for each low SNR image of the plurality of low SNR images; and
   for each low SNR image of the plurality of low SNR images, processing the low SNR image by the ML model to obtain predicted image data, and optimizing the ML model based on the predicted image data and the high SNR image,
   wherein the ML model, upon being trained, is usable for processing a runtime image of a semiconductor specimen with a low SNR to obtain an output image with a high SNR relatively higher with respect to the low SNR.

12. The method according to claim 11, wherein each low SNR image in the plurality of low SNR images is generated by:
   acquiring a sequence of frames by the examination tool in one run of scanning the first site;
   dividing the sequence of frames into a plurality of batches in accordance with a batch size;
   registering the plurality of batches; and
   combining the registered plurality of batches to obtain the low SNR image.

13. The method according to claim 12, wherein the batch size is specifically selected such that a correlation between the registered plurality of batches meets a predetermined threshold.

14. The method according to claim 12, wherein the low SNR image is generated using all frames in the sequence of frames, such that the ML model, upon being trained, is capable of generating, for a given runtime image, an output image with improved precision, taking into consideration one or more image artifacts in the given runtime image that are caused by one or more physical effects on the semiconductor specimen.

15. The method according to claim 11, wherein the high SNR image is generated by:
   normalizing the plurality of low SNR images to have similar image statistics;
   registering the plurality of normalized low SNR images, giving rise to a registered plurality of normalized low SNR images; and
   combining the registered plurality of normalized low SNR images to obtain the high SNR image.

16. The method according to claim 11, wherein the predicted image data is predicted noise between a predicted high SNR image and the low SNR image, and wherein the ML model is optimized using a loss function representative of a residual between the predicted noise and an actual noise between the low SNR image and the high SNR image.

17. The method according to claim 11, wherein the predicted image data is a predicted high SNR image, and wherein the ML model is optimized using a loss function representative of a difference between the predicted high SNR image and the high SNR image.

18. The method according to claim 11, wherein the plurality of low SNR images are acquired from a first detection perspective of the examination tool, and the training set further comprises a second plurality of low SNR images acquired from a second detection perspective of the examination tool, and a second high SNR image generated based on the second plurality of low SNR images, and wherein the ML model, upon being trained, is capable of processing runtime images acquired from the first detection perspective and the second detection perspective.

19. The method according to claim 11, wherein the training set further comprises a second plurality of low SNR images corresponding to a second plurality of sequences of frames acquired by the examination tool in a second plurality of runs of scanning a second site of the semiconductor specimen, and a second high SNR image generated based on the second plurality of low SNR images, wherein a first plurality of low SNR images and the second plurality of low SNR images are normalized to have similar image statistics, and a first high SNR image and the second high SNR image are normalized to have similar image statistics, prior to the training, and wherein the output image with a high SNR as generated by the ML model is usable for obtaining measurements with improved precision.

20. A non-transitory computer readable storage medium tangibly embodying a program of instructions that, when executed by a computer, cause the computer to perform an image generation method, the method comprising:
obtaining a runtime image of a semiconductor specimen with a low Signal-to-noise ratio (SNR); and
processing the runtime image using a machine learning (ML) model to obtain an output image with a high SNR relatively higher with respect to the low SNR, wherein the ML model is previously trained during setup using a training set comprising a plurality of low SNR images respectively associated with a same high SNR image, the plurality of low SNR images respectively generated from a plurality of sequences of frames acquired by an examination tool in a plurality of runs of scanning a first site of the semiconductor specimen, the high SNR image generated based on the plurality of low SNR images and used as ground truth data for each low SNR image of the plurality of low SNR images, and
wherein the training of the ML model comprises, for each low SNR image: processing the low SNR image by the ML model to obtain predicted image data, and optimizing the ML model based on the predicted image data and the high SNR image.

* * * * *